United States Patent Office 3,264,806
Patented August 9, 1966

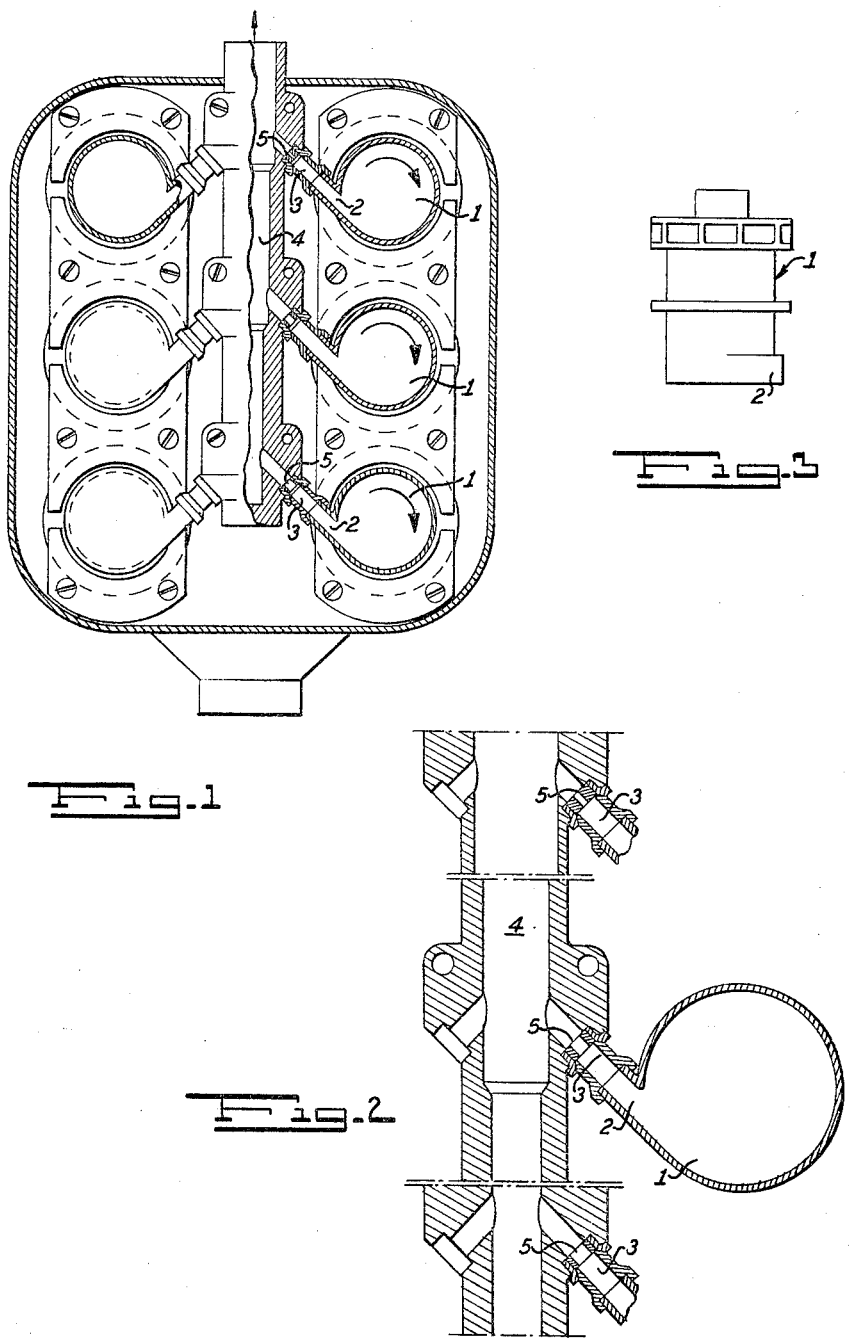

3,264,806
CENTRIFUGAL DUST SEPARATOR ASSEMBLY
Willy Neumann, Hohenweg 26, Wilhelmsfeld,
Odenwald, Germany
Continuation of application Ser. No. 77,435, Dec. 21, 1960. This application Jan. 17, 1964, Ser. No. 338,391
Claims priority, application Germany, Dec. 22, 1959, N 17,675
3 Claims. (Cl. 55—346)

This application is a continuation of my earlier application Ser. No. 77,435, filed Dec. 21, 1960, now abandoned.

The invention relates to a centrifugal dust separator assembly. The assembly is of the type in which a plurality of vortex chambers are provided in series, and separated dust is discharged through a common dust collecting pipe.

The assembly includes a known vortex chamber for the separation of dust, and the arrangement of the assembly is such that the extracted dust is drawn by suction into a connecting passage opening tangentially in a housing wall above a housing floor of the chamber. The vortex chambers are made such that the dust extraction is effected through a dust collecting pipe whereinto open the individual connecting passages.

In the existing art it is a drawback that the speed of dust-carrying fluid is of quite differing rates in the dust collecting pipe. At the beginning of said pipe, only the air flows which has been sucked in from one or a few vortex chambers and, consequently, the mass flow, the density, as well as the speed, are relatively low. On the other hand, at the end of the collecting pipe, through which flows the air sucked in from the sum total of all vortex chambers, the speed is high.

If the speed is too low, the entrained dust may be deposited while if the speed is too high, losses in the line, with resulting losses in output, will occur.

Another disadvantage is that different pressures are built up along the dust collecting pipe due to the friction in the dust collecting pipe, and because of the arrangement of the connecting passages opening into said dust collecting pipe. Consequently, if appropriate means are not provided, a different suction pressure would exist at each one of the vortex chambers, thus making the suction operation non-uniform. If the suction pressure becomes insufficient, for any of the chambers then there will not be obtained any discharge of dust from such chambers.

It is an object of the invention to provide apparatus in which uniform suction operations will be obtained for all the chambers.

It is a further object of the invention to provide apparatus such that the speed of the fluid in the collecting pipe will be substantially uniform for the entire length of the pipe.

According to the invention, the diameter of the dust collecting pipe behind the orifice of every connecting passage is enlarged such that the flow rate remains approximately constant in spite of the increase in the quantity of fluid flow. Furthermore, diaphragms are mounted inside the connecting passages, with their diameters being suitably dimensioned so that by appropriate decreases in pressure, the suction pressure of each vortex chamber will be the same.

The invention will be described in relation to the embodiment illustrated in the drawing wherein:

FIGURE 1 is a fragmentary sectional top view of an assembly according to the invention in which six vortex chambers are arranged in pairs; and FIGURE 2 is an enlarged view showing the details of the connection of one chamber in the assembly; and FIGURE 3 is an elevation view of one of the chambers.

The air current in said chambers rotates in whirling fashion in the direction of the arrows in FIG. 1. On the floor of each chamber is located an orifice 2 which constitutes a dust extraction opening. The orifices 2 are connected with dust collecting pipe 4 through respective connecting passages 3.

In each connecting passage 3 there is provided orifice plate 5, which reduces the pressure of the air flowing from the corresponding chamber to the collecting pipe 4. The diameter of the openings of said orifice plates are decreased in a downstream direction, i.e., in the direction of flow of the air currents in the collecting pipe 4. Thus the orifice plate with the largest diameter is provided in the first connecting passage 3 located upstream and if desired the orifice plate may be omitted from the first upstream connecting passage. The direction of flow of the air in the collecting pipe 4 is shown by the arrow in FIG. 1.

In order to establish a constant rate of flow of fluid in the collecting pipe 4, the diameter of the pipe 4 widens stepwise in the direction of the air current. Thus the pipe 4 is enlarged at the locations where the connecting passages 3 open into the pipe 4 such that when an increased quantity of fluid is admitted into the pipe 4 through a particular passage 3, the pipe 4 will have a larger section and will be able to convey the increased quantity of fluid at the same rate as that of the fluid in the pipe 4 upstream of the particular passage 3.

The diameter of every section of the dust collecting pipe is preferably dimensioned such that the rate of speed of the fluid along the entire pipe is approximately 8.5 m./sec. The dimensions of the diameter of the orifice plates are established by measuring the pressure differentials and adjusting the diaphragm openings until the pressure along the length of the collecting pipe 4 is constant.

Numerous modifications and variations of the disclosed embodiment will become apparent to those skilled in the art without, however, departing from the spirit of the invention as defined by the attached claims.

What is claimed is:

1. A centrifugal dust separator having a plurality of vortex chambers in series arrangement, each said chamber being provided with an orifice for the outflow of dust-containing fluid, said separator comprising a common dust collecting conduit for said chambers, connecting passages extending tangentially from respective chambers in communication with the orifices thereof and opening into said common conduit in series arrangement whereby fluid may flow from each chamber into the conduit wherein the fluid flows toward a common outlet, orifice plates in said passages having openings which respectively diminish in the direction of fluid flow in the conduit, said conduit having sections of stepwise increased diameter in the direction of fluid flow in the conduit wherein each stepwise increase is provided prior to the location where the respective passages open into the conduit.

2. A separator as claimed in claim 1 wherein said chambers are arranged in two parallel lines one on either side of the conduit.

3. A centrifugal dust separator having a plurality of vortex chambers in series arrangement, each of said chambers being provided with an orifice for the outflow of dust-containing fluid, said separator comprising a common dust collecting conduit for said chambers, connecting passages extending tangentially from respective chambers in communication with the orifices thereof and opening into said common conduit in series arrangement whereby fluid may flow from each chamber into the conduit wherein the fluid flows toward a common outlet, orifice plates in said passages having openings which respectively diminish in the direction of fluid flow in the conduit, said conduit increasing in diameter in the direction of fluid flow in stepwise increments prior to respective orifices to provide a uniform rate of flow and uniform pressure conditions in the conduit for the entire length thereof.

References Cited by the Examiner

UNITED STATES PATENTS

| | | | |
|---|---|---|---|
| 1,496,908 | 6/1924 | Schutz | 55—426 |
| 2,705,543 | 4/1955 | Torres | 55—467 |
| 2,762,450 | 9/1956 | Westlin | 55—338 |
| 2,771,962 | 11/1956 | Yellott et al. | 55—466 X |
| 2,911,065 | 11/1959 | Yellott et al. | 55—344 |
| 2,927,693 | 3/1960 | Freeman et al. | 209—211 |

FOREIGN PATENTS

| | | |
|---|---|---|
| 165,966 | 12/1905 | Germany. |
| 749,284 | 11/1944 | Germany. |
| 824,749 | 12/1959 | Great Britain. |

ROBERT F. BURNETT, *Primary Examiner.*

HARRY B. THORNTON, *Examiner.*